(12) United States Patent
Kleuderlein et al.

(10) Patent No.: US 9,999,854 B2
(45) Date of Patent: Jun. 19, 2018

(54) CATALYST MODULE, RECEIVING UNIT FOR SUCH A CATALYST MODULE AND METHOD FOR MANUFACTURING SUCH A CATALYST MODULE

(71) Applicant: Johnson Matthey Catalysts (Germany) GmbH, Redwitz (DE)

(72) Inventors: Robert Kleuderlein, Altenkunstadt (DE); Udo Klumpp, Marktgraitz (DE)

(73) Assignee: Johnson Matthey Catalysts (Germany) GMBH, Redwitz (DE)

( * ) Notice: Subject to any disclaimer, the term of this patent is extended or adjusted under 35 U.S.C. 154(b) by 347 days.

(21) Appl. No.: 14/633,316

(22) Filed: Feb. 27, 2015

(65) Prior Publication Data

US 2015/0238898 A1    Aug. 27, 2015

(30) Foreign Application Priority Data

Feb. 27, 2014    (DE) .......................... 10 2014 203 617

(51) Int. Cl.

| | |
|---|---|
| *F01N 3/10* | (2006.01) |
| *B01D 53/86* | (2006.01) |
| *F01N 3/28* | (2006.01) |
| *B01J 35/04* | (2006.01) |
| *F01N 13/18* | (2010.01) |
| *F01N 13/00* | (2010.01) |
| *B01J 35/00* | (2006.01) |
| *B01D 53/88* | (2006.01) |

(52) U.S. Cl.
CPC .......... *B01D 53/86* (2013.01); *B01J 35/0006* (2013.01); *B01J 35/04* (2013.01); *F01N 3/28* (2013.01); *F01N 3/2803* (2013.01); *F01N 3/2814* (2013.01); *F01N 3/2839* (2013.01); *F01N 3/2842* (2013.01); *F01N 13/017* (2014.06); *F01N 13/185* (2013.01); *F01N 13/1855* (2013.01); *B01D 53/88* (2013.01); *F01N 2350/00* (2013.01); *F01N 2450/30* (2013.01); *F01N 2590/02* (2013.01); *F01N 2590/10* (2013.01); *Y10T 29/49345* (2015.01)

(58) Field of Classification Search
CPC .... F01N 3/2803; F01N 3/2839; F01N 3/2842; F01N 3/28; F01N 13/1855; F01N 3/2814
USPC ................................... 422/180, 177; 55/523
See application file for complete search history.

(56) References Cited

U.S. PATENT DOCUMENTS

| | | | |
|---|---|---|---|
| 4,814,146 A | 3/1989 | Brand et al. | |
| 4,849,185 A * | 7/1989 | Wittig | B01D 53/86 34/242 |
| 4,916,001 A | 4/1990 | Whittenberger et al. | |

(Continued)

FOREIGN PATENT DOCUMENTS

| | | |
|---|---|---|
| DE | 8605649 U1 | 4/1986 |
| DE | 102011001367 A1 | 9/2012 |

(Continued)

*Primary Examiner* — Tom P Duong

(57) ABSTRACT

The catalyst module is designed for use in an emission control system of a stationary incinerator. It comprises a stack frame, into which several mounting units are inserted strung together. The mounting units have a peripheral side wall as well as several partitions, which are entangled with one another and form a lattice with a plurality of mounting shafts, in which in each case one catalyst is inserted. The catalysts are pressed into position preferably with the interposition of an elastic fitting element.

10 Claims, 4 Drawing Sheets

(56) References Cited

U.S. PATENT DOCUMENTS

Figure 1:
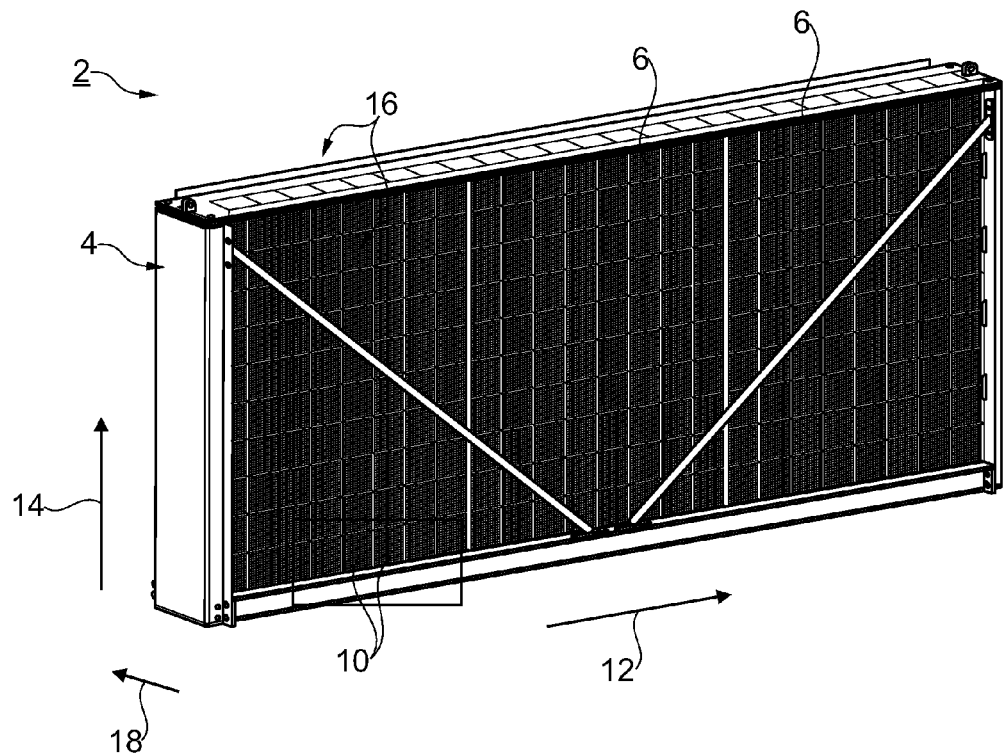

| | | |
|---|---|---|
| 5,809,645 A | 9/1998 | Thomsen et al. |
| 2004/0009874 A1 | 1/2004 | Koike et al. |

FOREIGN PATENT DOCUMENTS

| | | |
|---|---|---|
| JP | 54071766 | 6/1979 |
| JP | 62121638 | 6/1987 |
| JP | 07019036 A1 | 1/1995 |

* cited by examiner

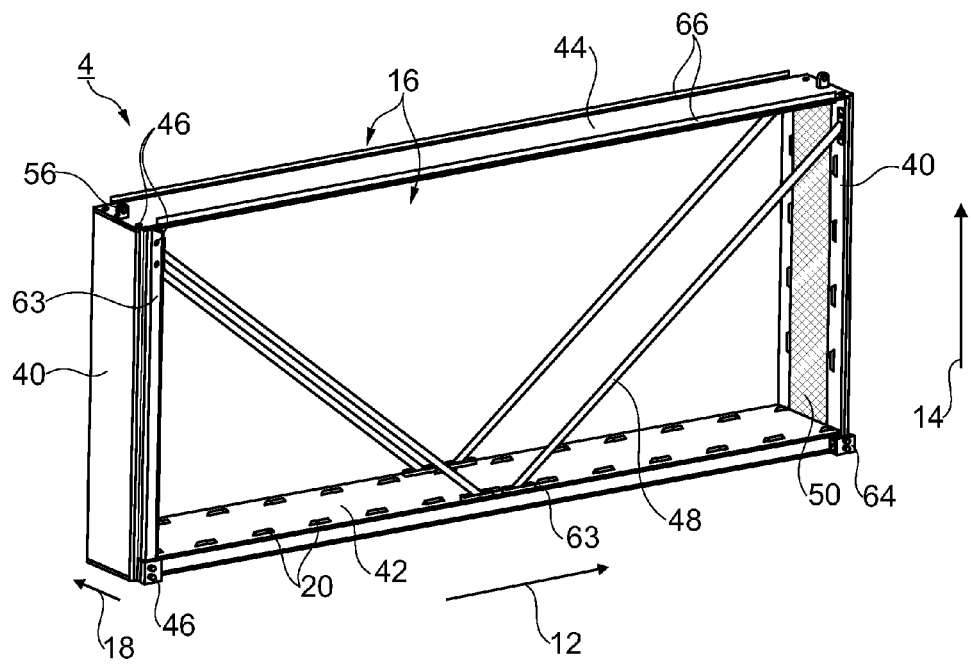
Fig. 6
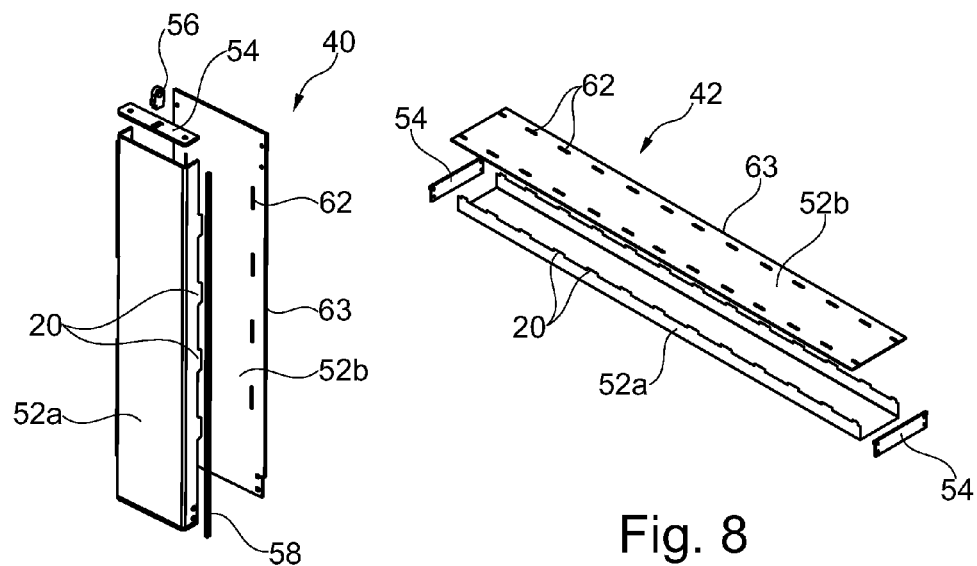
Fig. 7
Fig. 8

CATALYST MODULE, RECEIVING UNIT FOR SUCH A CATALYST MODULE AND METHOD FOR MANUFACTURING SUCH A CATALYST MODULE

CROSS-REFERENCE TO RELATED APPLICATIONS

This application claims priority to German Patent Application No. DE 10 2014 203 617.8, filed on Feb. 27, 2014, and is incorporated herein by reference.

The invention relates to a catalyst module for use in an emission control system of a stationary incinerator, a mounting unit and a method for producing such a catalyst module.

A stationary incinerator is understood to be any plant for combustion of hydrocarbon-based fuels, for example coal- or oil (petroleum)-fired plants or gas turbines. Stationary incinerators also encompass marine applications, for example incinerators such as diesel engines, as used for large container or cruise ships. The stationary incinerators are conventionally operated continuously under a constant, stationary load.

Stationary incinerators usually have an emission control system, which is provided with catalyst modules. In this connection, the catalyst modules are installed in a flue gas duct of the emission control system and the flue gas, which is to be purified, flows through them when the installation is in operation. In this connection, the flue gas duct typically has a cross-sectional area of at least several square meters and typically also of several tens of square meters. Frequently, the flue gas duct has a rectangular cross-sectional area with an edge length in each case of several meters, for example, of 10 m×10 m. The whole cross-sectional area of the flue gas duct is covered by one or also by several catalyst modules, which are arranged next to one another, so that all the flue gas, which is to be purified, flows through the catalyst modules. Frequently, several catalyst modules, for example, two to five, are disposed next to one another in rows and columns in a supporting frame within the flue gas duct. The catalyst modules themselves therefore typically have a rectangular cross-section with an edge length of in each case several meters.

Moreover, in the direction of flow of the flue gas, the catalyst modules frequently are disposed in several planes one behind the other. Also in the direction of flow, a catalyst installation, bunt up from catalyst modules, extends for several meters, especially for several tens of meters, for example, for 25 m.

The catalyst modules each comprise a stacking frame, in which several mounting units are inserted, which, in turn, are provided with several catalysts. In this connection, the flue gas flows through the individual catalysts in the direction of flow. These catalysts are, for example, plate catalysts. However, in the present case of interest, they are preferably so-called honeycomb catalysts. These honeycomb catalysts are monolithic components of a ceramic material, which is permeated by a plurality of flow channels in the direction of flow. In the installed, operating state, the flue gas, which is to be purified, flows through the flow channels. This monolithic structure has catalytic activity with respect to purifying the flue gas. Alternatively, the monolithic carrier is provided with a catalytically active coating or the carrier material itself is catalytically active. In particular, these honeycomb catalysts are extruded honeycomb catalysts. A respective catalyst typically has a rectangular and, in particular, a square cross-sectional area with an edge length of about 10 cm to 30 cm.

In a first variation, the mounting units are so-called element boxes, in which the individual catalysts are arranged in matrix fashion, adjoining one another. At the same time, sealing elements, usually in the form of nonwoven fabric, which are intended to prevent leakage flow through the boundary planes between adjacent catalysts or between the catalysts and the element boxes, are preferably disposed between the individual catalysts. Typically in this connection, two to ten catalysts with, in each case, a rectangular and, in particular, a square cross-sectional area, are disposed usually in several layers above or next to one another in a respective element box.

The element boxes themselves are disposed also in matrix fashion within the stack frame. The number of element boxes depends on the size of the catalyst module. The element boxes usually are sheet-metal parts, which have edges, which are in each case folded over about 90° at opposite sides for reinforcing purposes. In operation, these are therefore oriented perpendicularly to the direction of flow of the flue gas, which is to be purified, and, with that, form surfaces, which undesirably resist flow. Aside from the element boxes, which typically are disposed in several rows in a stack frame, the mounting units of a second variation are constructed as so-called packing and storage units, which, in each case, are also provided with catalysts. In comparison to element boxes, these are larger and, within a catalyst module, typically are disposed only in one row. Usually, sealing and compensating elements of a nonwoven fabric are in turn disposed between the catalysts.

In the emission control system, the catalyst modules are fastened to one another with the help of the stack frame. The catalyst modules are prefabricated as construction units, usually by the manufacturer of the catalysts, for example, and installed as such. During operation, the catalyst modules must withstand mechanical as well as thermal loads. The temperature of the flue gas in such stationary installations typically ranges from, for example, 400° to 500°. With regard to as effective a purification of the flue gas as possible, leakage flows should be avoided so that the whole of the flue gas flows past the catalytically active surfaces. With regard to minimizing flow pressure losses, it is also desirable to utilize the largest possible proportion of the cross-sectional area of the flue gas duct.

The stack frame of the prior art is a welded steel profile, in which the individual mounting units, that is, for example, the element boxes or also the packing and storage units, are inserted. In order to achieve secure mechanical fastening, the element boxes are each welded to the stack frame as well as to one another. In order to be able to equip the stack frame, the latter is overdimensioned to some degree. The gap, which remains, is sealed with a strip-shaped sealing element. However, the problem exists here that, because of different thermal coefficients of expansion, this strip-shaped sealing element may become detached during operation, so that leakage flows result. This problem also affects the sealing and compensating elements inserted between the individual catalysts. Overall, the danger therefore exists in the case of conventional units that, in the course of the operating time, leakage flows will result.

Arrangements with packing and storage units, in which, for example, in each case three such units per catalyst module are strung together, are welded together and to the stack frame these days in a costly pressing and welding device, which is especially manufactured for this purpose. For providing it with catalysts, a respective packing and storage unit initially is inserted in an open frame of the unit, after which the packing and storage units are braced against one another by pressing on a lid. Subsequently, the lid is welded to the side parts of the packing and storage unit. These packing and storage units are then, in turn, placed in the stack frame, to which they are welded. Here also, it is necessary once again to seal. Because of this complex manufacturing process, an expensive welding device is required and typically also matched in each case to the size of a respective catalyst module. As a result, the total manufacturing costs are comparatively high.

Starting out from the above, it is an object of the invention to indicate a simple production of a catalyst module, which has good flow properties and an improved cleaning efficiency because of less leakage.

Pursuant to the invention, this objective is accomplished by a catalyst module for use in an emission control system of a stationary incinerator. The catalyst module is therefore designed and conceived for such previously described emission control systems of stationary incinerators, especially of power plants for generating energy. Reference is made to the previous versions with respect to the basic arrangement as well as with respect to the basic construction and the size relationships of such catalyst modules.

The catalyst module comprises a stack frame having a base part and a lid part as well as two side parts. The stack frame extends in a longitudinal as well as in a transverse direction and has two opposite surfaces in a flow direction, which surfaces are bordered by the base part, the lid part and the two side parts. The surfaces are braced in the longitudinal direction and in the transverse direction and are oriented perpendicularly to the direction of flow of a flue gas, when they are installed in a flue gas duct of the emission control system. At least one and preferably several prefabricated mounting units, which each have a peripheral side wall as well as several partitions, which preferably are entangled with one another, are inserted in the stack frame. The partitions form a lattice with a plurality of mounting shafts, into each of which a single catalyst is inserted in an accurately fitting manner. "In an accurately fitting manner" is understood to mean in this connection that the individual catalyst, optionally apart from a clearance, is matched to the cross-sectional geometry of the respective mounting shaft.

Preferably, the catalysts are monolithic honeycomb catalysts, consisting of a ceramic carrier material, which is permeated by a plurality of individual flow ducts. Alternatively, the carrier material is provided with a catalytically active layer or is itself catalytically active, A catalyst is generally understood to be a unit with a catalytic activity for the desired purification of the flue gas. Aside from (extruded) honeycomb catalysts, plate catalysts may, for example, also be used. Preferably, however, the catalysts in a catalyst module are not necessarily identical to one another. Several partial catalyst units, that is to say, for example, several monolithic honeycomb bodies, may also be inserted one after the other in the flow direction. These partial units, strung together in the flow direction, then form the one catalyst. If necessary, the partial units are different with respect to the catalytic activity thereof. Preferably, they are identical.

In the following, the mounting unit is also referred to as a Canning unit, on the basis of the Canning method, which is known in the area of catalysts for motor vehicles for installing a honeycomb catalyst in a housing.

This arrangement of the mounting units as Canning units starts out from the previously described variation of the version with the packing and storage units, in which the individual catalysts are disposed. In contrast to this, the mounting units are supplemented with partitions, so that each catalyst is inserted individually in a respective mounting shaft.

Due to the formation of the individual mounting shafts and the one by one holding of the catalysts, an expensive pressing of the catalysts within the packing or storage unit, which was required previously, is no longer necessary. As a result, the installation process is clearly simplified. In particular, an expensive pressing and welding process is also no longer required. Moreover, due to the one by one mounting of the individual catalysts, a simplified sealing and, with that, an improvement in the flow properties are also achieved.

A further advantage is to be seen in that the individual catalysts are exposed now only to lower pressing forces during the assembly of the stack frame. In comparison to previous solutions, the catalysts need only be formed now with a lesser mechanical stiffness. This also has a favorable effect on the flow properties of the catalyst, especially the honeycomb catalyst, so that an improved cleaning efficiency is also achieved by these means.

Preferably, a seal is generally produced with the help of a sealing element between the catalysts and the respective mounting shaft, so that there will be no leakage flows between the catalyst and an internal wall of the mounting shaft. The sealing element preferably is disposed peripherally around the catalyst, so that it surrounds the whole of the peripheral wall of the catalyst and only the two opposite sides of the catalyst in the flow direction are free.

Expediently, the catalysts, with in each case interposition of an in particular elastic fitting element as sealing element and, in particular, without further fastening means or holding elements, are inserted and, in particular, pressed for this purpose into a respective mounting shaft. As a consequence of this pressing in, the respective catalyst is clamped and, with that, held reliably and securely in the mounting shaft. No further means for holding the catalyst are required. At the same time, due to the elastic fitting element, a reliable seal between the catalyst and the inner wall of the respective mounting shaft is attained. An elastic fitting element is in the first instance generally understood to be any element, which is elastic and ensures sealing of the leakage gap permanently even at the high operating temperatures of several hundred degrees centigrade. Here, elastic is generally understood to mean that a deformation of the fitting element, for example a change in the thickness by more than 10%, for example by from 10% to 30%, is possible while maintaining an (elastic) restoring force, with the result that the fitting element is therefore preferably held between the wall of the mounting shaft and the catalyst solely by way of the elastic restoring force.

The use of the fitting element at the same time also provides a means which insulates the catalyst against forces which are caused by temperature changes during heating up and contact with the walls which surround it, or against vibrations or jolts which can occur during normal operation and act on the catalyst. This makes it possible to use catalysts which are weaker in terms of their structure than those currently in use. At the same time, advantages such as reduced back-pressure, etc. are associated with this, since, on account of the insulating properties, they certainly do not have to have the strength exhibited by conventional catalysts.

Preferably, the fitting element lies peripherally around the respective catalyst and, in particular, also over the whole surface. The fitting element therefore, in particular, is one or more plate-shaped or mat-shaped elements, especially of a nonwoven material or of a material which is like a nonwoven material. Such mat-shaped elements are also referred to as supporting mats. Preferably, a flat, plate-like supporting mat is disposed at each side of the catalyst. At their edges, the supporting mats engage in one another, for example in a clamping manner. The supporting mats are therefore substantially flat rectangular elements which are introduced in terms of area with a rectangular basic area between the catalyst and a respective wall region of the mounting shaft.

Expediently, the fitting element is constructed in such a manner that it expands specifically when the temperature increases and does so, moreover, in such a manner that a temperature-related variation of a necessary fitting distance between the respective catalyst and the mounting shaft is compensated for, so that an adequate clamping force for fixing the catalyst is maintained. This arrangement starts out from the consideration that the catalyst and the mounting unit consist of different materials with different coefficients of thermal expansion. In contrast to the ceramic carrier material of the catalysts, the mounting units and, in particular, the walls of the mounting shafts consist of steel sheets. Because of the temperature differences typically of approximately 400° C. to 500° C. between the installed state and the normal operational state or also between a starting up state and a normal operational state, the catalysts on the one hand and the mounting units on the other expand differently, which leads to a variation in the distance between the respective catalyst and an interior wall of the respective mounting shaft. This distance, referred to as fitting distance, is necessary in order to be able to fit catalysts, in particular the ceramic honeycomb catalysts, into the respective mounting shafts. The fitting distance is filled up by the elastic fitting element. Due to the fitting element, it is now reliably achieved that the clamping force, which is introduced during the installation and holds the catalyst in the mounting shaft, is also maintained during temperature changes. On the one hand, a permanent, reliable fixing of the catalysts within the mounting shafts is achieved by these means. On the other, it is also avoided by these means that the fitting elements fall out, possibly resulting in leakages.

With regard to as simple a construction as possible, the partitions for forming the individual mounting shafts are formed by entangled metal sheets, which cross one another vertically as well as horizontally. These extend in each case over the whole length and width of the mounting units. Especially at a grid spacing, which corresponds to an edge length of the mounting shafts, the partitions therefore have slots and are inserted into one another at these slots. There are in principle also other possibilities for forming the mounting shafts.

The partitions have edges, which are oriented towards the surfaces of the stack frame. The edges therefore lie opposite one another when viewed in the direction of flow. The edges, in particular the edge pointing to an inflow side on a flue gas entry side of the stack frame, preferably have only a thickness which corresponds to the normal thickness of the sheet metal. The edges therefore particularly are not folded down, that is, they are not bent at the edges thereof. As a result, a lower flow resistance is achieved compared to bent-over edges. As a result, the inflow surface is increased, in particular, by almost 100% of the area of the mounting units.

Usually, this inflow surface of a mounting unit amounts to a few square meters. Typically, each mounting unit has a length and a width of the order of a few meters, for example, of the order of 1 m to 5 m. The individual mounting units have a square or rectangular base. Within the stack frame, they are preferably disposed only in one row, based on the transverse direction. Several mounting units, for example, two to five mounting units are disposed next to one another in the longitudinal direction of the stack frame over the length of the stack frame.

According to a preferred further development, the stack frame has a peripheral wall, which is composed of individual side frame parts, which are connected and especially bolted to one another by at least one and preferably several mechanical connecting elements. Preferably, the side frame parts are not welded together. Preferably, they are connected exclusively by the mechanical connecting elements, especially by the bolts. The mechanical connecting elements are therefore preferably bolting elements, for example bolts with nuts, threaded bolts, etc.

Due to this in particular boltable arrangement, there is no need for a pressing and welding facility. By these means, the individual catalyst modules can therefore be adapted without problems, for example, with regard to their size, flexibly to the respective application, i.e. the specific installation situation in a plant. With that, the total manufacturing costs are kept low. Due to the arrangement, in which the side frame parts are connected by way of the mechanical connectors, assembly directly at the building site is also simplified. Until now, the catalyst modules were prefabricated at a production site and moved as prefabricated units to the building site or the place of use. Special protective measures were also required for this transport. In comparison to this, the transport in individual parts is simplified.

Furthermore expediently, a sealing element is pressed between at least one side frame part and an adjoining mounting unit and, specifically, because of a bracing of the one side frame part during the installation thereof with the help of the mechanical connecting element. During the production, the sealing element is therefore initially placed on one of the mounting units at the edge, before the adjoining side frame part is bolted to the further side frame parts. The sealing element is pressed here between the side frame part and the at least one mounting unit. At the same time, the pressing force is applied by the mechanical connecting element. All the mounting units are clamped into the stack frame by these means. A sealing element is preferably also inserted between each of the mounting units and between each of the mounting units and a side frame part.

The sealing element is therefore substantially a flat, plate-shaped or strip-shaped and overall rectangular element which is configured in terms of area with a preferably rectangular basic area and is introduced between the mounting units and the respective side frame part.

The special advantage achieved by this measure is that the sealing element is firmly pressed by the bolting of the side frame parts, i.e. is compressed because of its elastic properties. As a result, variations in the distance between the side frame parts and the mounting units are equalized even if the thermal expansion of the individual components is different. If there is a change in temperature, for example, between the installation and the operation or also when the incinerator is started up, the sealing element is prevented by these means from falling out and, with that, the occurrence of leakage flows is avoided reliably.

The use of the sealing element at the same time also provides a means which insulates the catalyst against forces which are caused by temperature changes during heating up and contact with the walls which surround it, or against vibrations or jolts which can occur during normal operation and act on the catalyst. This makes it possible to use catalysts which are weaker in terms of their structure than those currently in use. At the same time, advantages such as reduced back-pressure, etc. are associated with this, since, on account of the insulating properties, they certainly do not have to have the strength exhibited by conventional catalysts.

With regard to manufacturing the stack frame as simply and as cost effectively as possible, the side frame parts thereof preferably are formed at least partly from sheet metal parts, which have been bent over. In order to form the side frame parts, U-shaped profiles, for example, are preferably formed from initially planar metal sheets by edge parts being bent over, which U-shaped profiles are configured by way of a further sheet metal element to produce a closed polygonal profile. By these means, a sufficiently high stability is achieved with a comparatively low use of material. In combination with the boltable arrangement, this also leads to the fact that the individual side frame parts can be transported in a space-saving manner as individual elements. In this connection, the respective side frame part is formed by an elongated, flat element.

Expediently, the side frame parts are constructed in each case as a hollow profile of two sheet metal parts, which are connected to one another. At least one of these sheet-metal parts is bent over and forms, for example, a U-shaped profile, on which then the second sheet-metal part is placed as if it were a lid. To connect them, these two sheet-metal parts interlock positively with one another, in particular via brackets and slots, so that a high mechanical stability is attained.

In a preferred arrangement, at least some and preferably all of the side frame parts have retaining brackets, between which a respective mounting unit is held positively in the direction of flow. By this measure, the mounting units are additionally secured mechanically within the side frame part. Expediently, welding of the mounting units to the side frame parts is foregone and these units are exclusively held positively by the holding brackets. The mounting units are therefore fixed in the direction of flow by the holding brackets. When viewed in the direction of flow, the holding brackets preferably are disposed on either side of the mounting units.

Expediently, one of the side frame parts is constructed as a lid part. On the outside, it has at least one sealing web, which is disposed at the edge and preferably is formed by bending over the side frame part. The function of this sealing web is too close off a parting plane between two adjacent catalysts modules in the installed state. Preferably, the lid part as a whole is bent over U-shaped, so that such a sealing web is formed as a fold on either side of the longitudinal edges of the lid part. As seen in the direction of flow, an adjacent catalyst module with a base element is accommodated between these sealing webs.

The arrangement of the stack frame described here, especially the aspect of the connection of the side frame parts by mechanical connecting elements, preferably with the pressed-in sealing element and/or the aspect of the formation of the side frame parts as sheet metal parts, which have been bent over, is regarded in each case as an independent inventive aspect independently of the special arrangement of the mounting units as Canning units with the mutually crossing partitions.

The objective of the invention is furthermore accomplished by a mounting unit for a catalyst module, which mounting unit has a peripheral side wall as well as several partitions, which form a lattice with a plurality of mounting shafts, into which in each case one catalyst can be inserted.

The preferred embodiments of the mounting unit, described in connection with the catalyst module, are also to be transferred analogously to the mounting unit as such.

The invention is furthermore accomplished by a method for producing a catalyst module in which a respective mounting unit is provided with catalysts, the stack frame is assembled initially only partly, the mounting units are inserted in the stack frame, which has been assembled only partly, and the stack frame is closed off, especially, by pressing a sealing element between one side frame part of the stack frame and at least one of the mounting units.

For the method, on the one hand, the mounting unit, which is constructed as a Canning unit, is provided with the individual catalysts, especially honeycomb catalysts. Initially, the stack frame is assembled only partly and the individual mounting units are inserted successively in this stack frame, which has been assembled only partly. Subsequently, the stack frame is dosed. Preferably, especially a mat-shaped sealing element, particularly a nonwoven mat, is put down first, before the stack frame is dosed with compression of the sealing element. The sealing element is pressed here between a side frame part of the stack frame and at least one of the mounting units. Preferably, the sealing element generally rests on the entire surface of the mounting units. During the installation, the sealing element initially is fixed, for example, by gluing, either to the respective mounting unit or to a side frame part.

Preferably, the mounting unit is equipped with the help of an insertable funnel. For this purpose, the catalyst is surrounded peripherally by an elastic fitting element with the exception of the sides, which are opposite one another in the direction of flow. By way of an at least slightly conical and, with that, funnel-shaped arrangement of the insertable funnel, the catalyst, enveloped by the fitting element, is pressed through the funnel, whereby the fitting element is compressed here. At the same time, the funnel is placed directly on a respective mounting shaft, so that the enveloped catalyst is pushed into the respective mounting shaft. The cross-sectional area of the outlet of the funnel is preferably slightly smaller here than the cross-sectional area of the mounting shaft, so that the enveloped catalyst can be introduced into the mounting shaft largely without problems. Because of the elasticity of the fitting element, the catalyst is then held clamped in the mounting shaft by the elastic forces. The individual mounting shafts of the mounting unit are then provided successively with the help of the insertable funnel. Preferably, this takes place automatically or else fully automatically. Several partial catalyst units can also be inserted one after the other in the direction of flow. These partial units, strung together in the direction of flow, then form the catalyst. If necessary, the partial units are different with respect to their catalytic activity. Preferably, they are identical.

Figure 2:
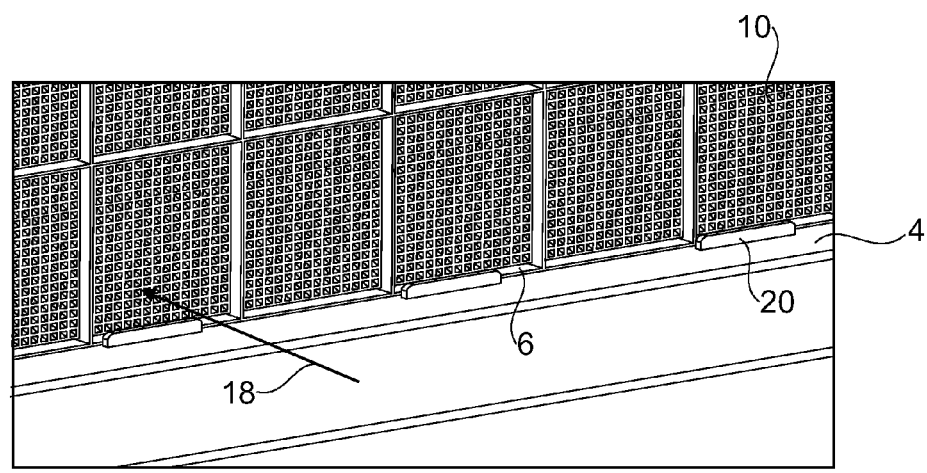
Figure 3:
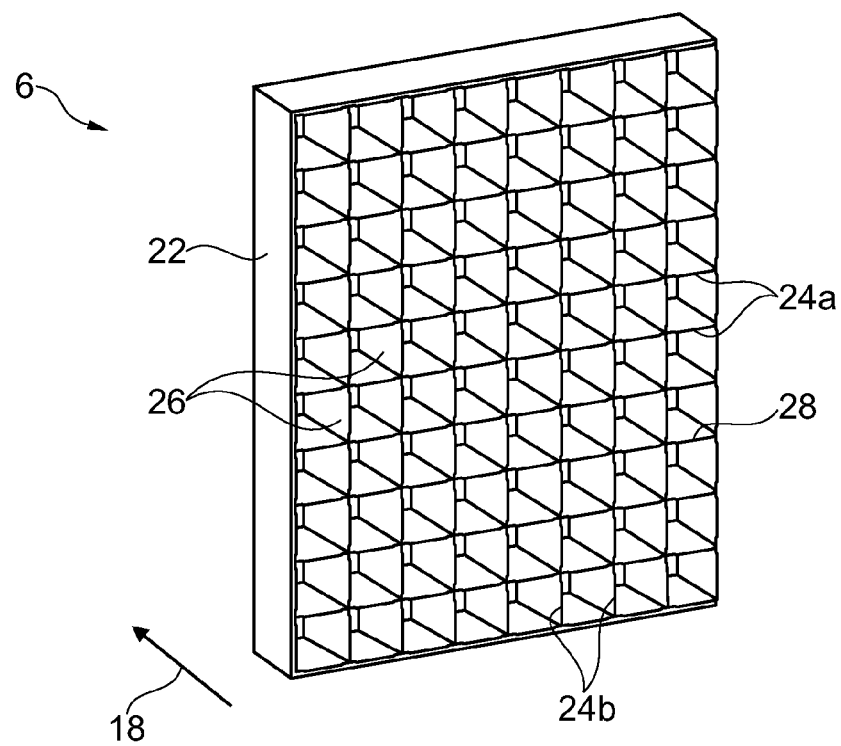
Figure 4:
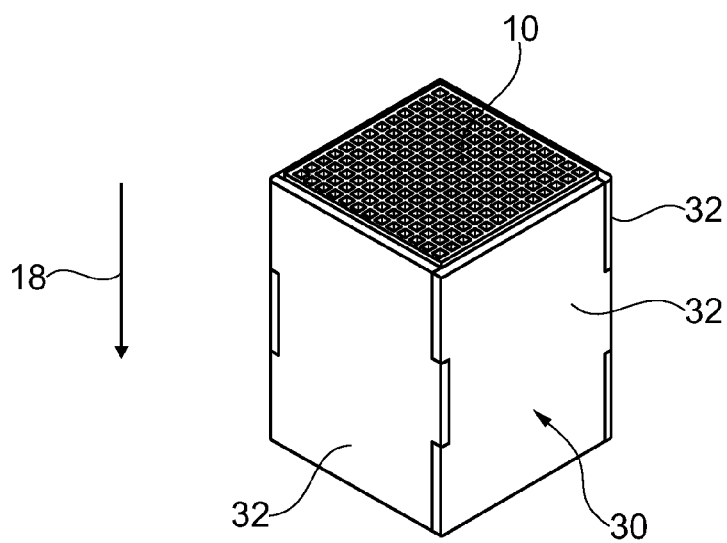
Figure 5:
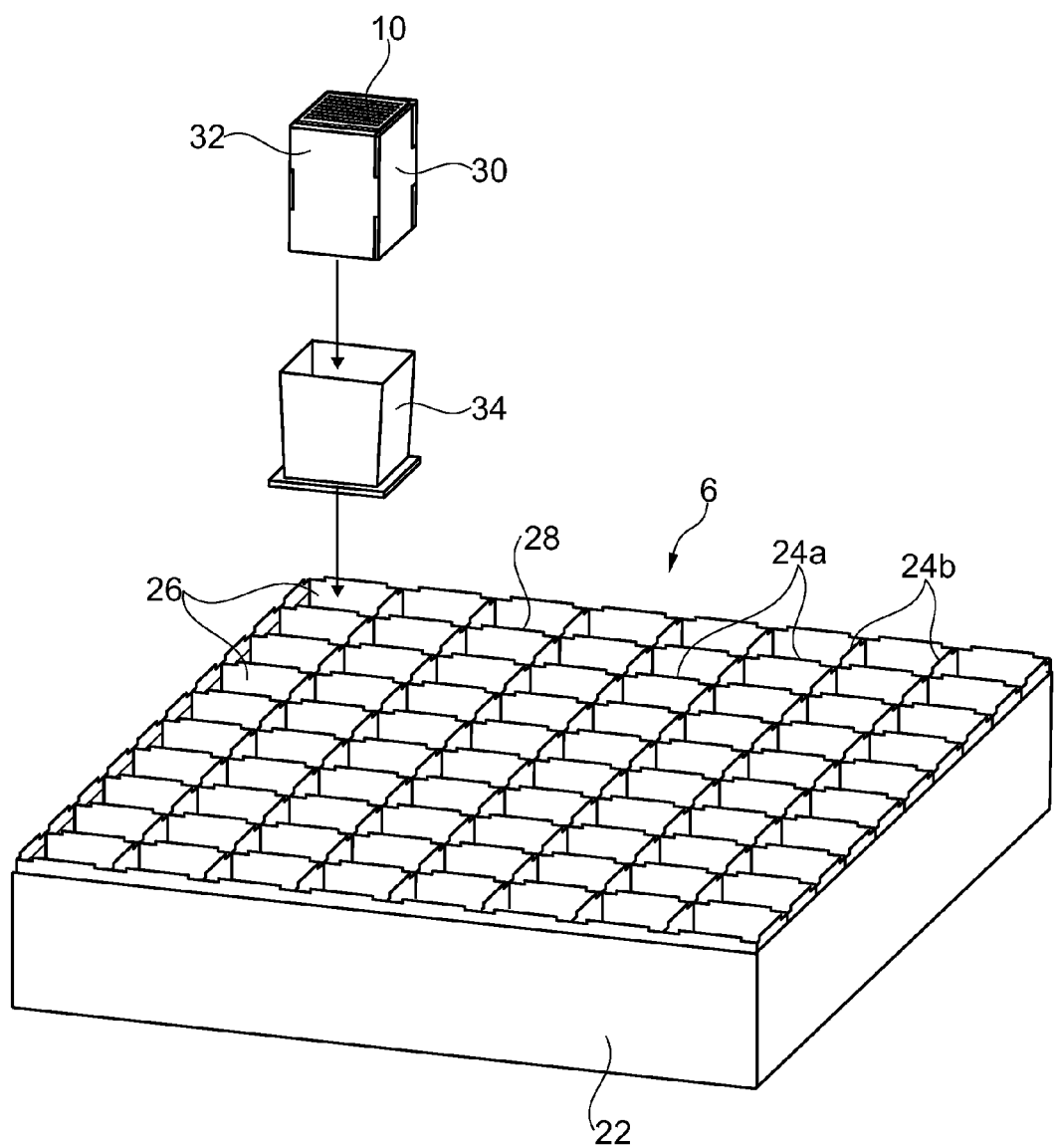

An example of the invention is explained in greater detail in the following by means of the Figures, in which FIG. 1 shows a perspective representation of a catalyst module, FIG. 2 shows an enlarged representation of the area of FIG. 1, which is marked with a rectangle, FIG. 3 shows a perspective view of a mounting unit, FIG. 4 shows a perspective representation of a catalyst, enveloped by a fitting element, FIG. 5 shows an exploded representation to illustrate the method of inserting an enveloped catalyst in a respective mounting shaft of the mounting unit, FIG. 6 shows a perspective representation of a stack frame, FIG. 7 shows an exploded representation of a side part of the stack frame and FIG. 8 shows an exploded representation of a base part of the stack frame.

In the Figures, components having the same effect have been provided with identical reference numbers.

The catalyst module 2, shown in FIG. 1, comprises a peripheral stack frame 4, in the interior of which several mounting units 6, adjoining one another in a row, are inserted. In the example, three mounting units 6 are inserted next to one another in one row. A plurality of catalysts 10 is inserted in each of the mounting units 6.

The catalyst module 2 extends in the longitudinal direction 12 as well as in the transverse direction 14 and has two opposite open surfaces 16, which are at a distance from one another in a direction of flow 18 preferably by the length of a respective catalyst 10. One surface 16 forms an inflow or inlet side and the other surface 16 forms an outflow side for a flue gas, which is to be cleaned and which flows through the catalyst module 2 in the installed state in the direction of flow 18.

In the example, the individual catalysts 10 are extruded, rectangular honeycomb catalysts with a plurality of flow ducts extending in the direction of flow 18. Alternatively, the catalysts 10 may also have a rectangular cross-sectional area, in which the edge lengths of the catalyst 10 are different. Usually, the catalysts 10 have a rectangular, especially square cross-sectional area and inflow surface, which has an edge length of 10 cm to 30 cm. The length of the catalyst 10 in the direction of flow 18 typically ranges up to a few 10 cm, for example from 15 cm to 60 cm. Other lengths are also possible. The width of the catalyst module 2 in the direction of flow 18 corresponds at least approximately to the length of the catalysts 10.

The total length of the catalyst module 2 in the length direction 12 and in the transverse direction 14 typically is in the area of a few meters. A plurality of catalyst modules 2 are usually in rows and columns in a flue gas duct with the aid of a supporting frame. A layer of this type of catalyst modules 2 extends in the longitudinal direction 12 and in the transverse direction 14, in each case for example over from 10 m to 20 m. A plurality of layers of this type consisting of a plurality of catalyst modules 2 then usually follow in the direction of flow 18. These layers make it possible for the exhaust gas to flow through a plurality of catalysts 10 during its passage through the flue gas duct. Different catalysts can be arranged in different layers. Different catalysts can also be positioned in different part regions of a mounting unit 6 or a catalyst module 2.

As can be inferred particularly from FIG. 2, there are several holding brackets 20 at the inside of the stack frame 4. These holding brackets hold the mounting unit 6 positively both in the direction of flow 18 and counter to the direction of flow 18.

The mounting unit 6, which is also referred to as a Canning unit, is shown as such in FIG. 3. R comprises a peripheral side wall 22. In the interior, defined by the side wall 22, the mounting unit 6 has a plurality of partitions, which are disposed in lattice fashion, namely horizontal partitions 24a and vertical partitions 24b. The partitions can alternatively also run along non-horizontal, or vertical, axes. The partitions are each preferably formed by metal (steel) sheets, which are connected, in particular entangled with one another. At abutment points at which they abut the peripheral side wall 22, they are fastened, for example, by welding.

A plurality of mounting shafts 26 is formed by the lattice-like structure of the partitions 24a, b. These therefore form an n×m matrix, wherein n and m typically range from 5 to 15. In the example, each mounting unit 6 forms an 8×10 matrix. In the fully assembled state, each mounting shaft 26 is provided with exactly one catalyst 10. The mounting shafts 26 are formed identically to one another. Alternatively, the mounting unit 6 can also have different mounting shafts 26. The partitions 24a, 24b each have an edge 28, at which the partitions 24a, 24b have the same material thickness as in the rest of the region, that is, they are not reinforced or bent over or the like in the edge region. The wall thickness of the partitions 24a, 24b, which preferably consist of steel sheet, preferably is somewhat less than the wall thickness of the side wall 22, which also preferably consists of steel sheet, and ranges, for example, from 1 mm to 2 mm, whereas the wall thickness of the side wall 22, which also preferably consists of steel sheet, ranges from 3 mm to 10 mm.

As shown in FIG. 4, an enveloped catalyst is pressed into each mounting shaft 26. The catalyst 10 is enveloped on all four sides thereof by an elastic fitting element 30, which is formed by four individual supporting mats 32 in the example of FIG. 4. Each supporting mat 32 covers one side of the catalyst 10 completely. Alternatively, a supporting mat 32 can also cover more than one side completely, for example two or more sides. In the example, the individual supporting mats 32 are entangled with one another at the joints, i.e. overlap one another. The thickness of the fitting element 30 and, with that, of the supporting mats 32 ranges from 6 mm to 10 mm. It consists of a nonwoven support material, in which there is a material, which has a coefficient of thermal expansion, which is at least similar to that of the material used for the mounting unit 6, in particular steel, "At least similar to" is understood to mean a coefficient of thermal expansion which differs by only 20% to 50% from that of steel, for example. Such a material is, for example, a so-called vermiculite. The material additionally has sufficient thermal stability to withstand the high temperatures occurring during operation. By these means, the supporting mats 32 are prevented from falling out when there are temperature changes, while the unit is in operation.

In the initial state, during installation, the catalyst 10, enveloped by the fitting element 30, is overdimensioned in comparison to the internal dimensions of the respective mounting shaft 26. For inserting the enveloped catalyst 10, an insertable funnel 34 is used and the enveloped catalyst 10 is pressed through the insertable funnel 10, as shown in FIG. 5. For this purpose, the insertable funnel 34 is in particular placed on the mounting unit 6. The fitting element 30 is compressed here and subsequently expands once again in the mounting shaft 26 because of its elasticity and, due to its elasticity, clamps the catalyst 10 in the mounting shaft 26.

The fitting of the enveloped catalyst 10 is preferably carried out automatically.

The stack frame 4 overall has a peripheral wall consisting of four side frame parts, namely two side parts 40, a base part 42 as well as a lid part 44. The side frame parts 40, 42, 44 are connected to one another by means of bolted connections, for example, with the help of bolts 46. For this purpose, for example, bolt nuts are fixed, for example welded, to the side frame parts 40 and bolts 46 are then screwed into the nuts. Alternatively, it is also possible to provide fixed threaded bolts, onto which nuts are then placed. A welded connection between these parts is foregone. To increase the stiffness, the stack frame 4 has additional struts 48, which are also fastened via bolted connections 46 to the side parts 40 or to the base part 42 and there, in each case, to the edge. Two struts 48, disposed approximately in the form of a V, are bolted to each surface 16.

In FIG. 6, a sealing element 50 is also shown at the right side part 40. In the example, it is formed, for example, from glass fibers as a mat-shaped nonwoven. Alternatively, it consists of the same material as the supporting mats 32. In the final, installed state, as shown in FIG. 1, this sealing element 30 is pressed between the right mounting unit 6 and the right side part 40. This sealing element 50 is also extended along the lid part 44 and also pressed at this longitudinal side in between the mounting units 6 and the lid part 44. In particular, the sealing element 50 is a two-dimensional, strip-shaped element with a width, for example, of a few centimeters. Its width may also correspond at least approximately to the depth of the mounting units 6 in the direction of flow 18. Its thickness is, for example, in the region of one or several centimeters. Sealing elements can likewise be inserted between adjacent mounting units 6.

In the example as shown in FIGS. 7 and 8, the side parts 40 as well as the base part 42 are constructed as hollow profiles consisting of sheet-metal parts, which are connected to one another. The sheet-metal parts may be welded to one another. Both the side parts 40 and the base part 42 have a U-shaped part, preferably sheet metal part 52*a*, and a flat part, preferably sheet metal part 52*b*, which are connected to one another, for example, by welding. At the sides, the hollow profile is closed off by covers 54 or end caps. A respective hook, in particular a ring hook 56 is fastened to the covers 54 of the side parts 40. The ring hook 56 serves, for example, for lifting or for handling the whole of the catalyst module 2, for example, with the help of a crane. Furthermore, at least one strip 58 is fastened and especially welded along the U-shaped sheet metal part 52*a*. This holds a sealing element, which is not shown here and which, in the installed state, seals the stack frame 4 to a supporting frame in the flue gas duct of the emission control system.

The sides of the U-shaped sheet metal part 52*a* are castellated at the ends and form the holding brackets 20. The holding brackets 20 are disposed in a specified grid dimension which, in the longitudinal direction 12, lies particularly in the range of 1 to 3 times the edge length of the catalysts 10. In the direction of flow 18, the holding brackets 20 preferably are opposite one another and the distance between them is equal to the depth of the mounting unit 6, so that the latter is held in the direction of flow 18 between the holding brackets 20.

Corresponding to the holding brackets 20, slots 62, through which the holding brackets 20 pass, are introduced, for example, by laser cutting in the same grid dimension in the flat sheet metal part 52*b*. The two sheet metal parts 52*a, b* are therefore, as it were, interlocked with one another and, additionally, preferably welded to one another. Additionally, holding elements 64, such as brackets or the like, may be disposed, for example in the corner regions at which the side frame parts 40 adjoin the base part 42, for fastening (by bolts) the individual side frame parts 40 to 44 to one another (for this purpose, compare FIGS. 1, 6). Alternatively or in addition, nuts, for example, are fixed at the side frame parts 40, especially at the side covers 54. The lid part 44 rests on the side frame parts 40 and is connected thereto by the bolted connections 46.

The flat sheet metal parts 52*b* protrude on both sides over the sides of the U-shaped sheet metal part 52*a* in the direction of flow 18 in each case by an edge strip 63. The struts 48, for example, are fastened to this edge strip.

In contrast to the side parts 40 and the base part 42, the lid part 44 is constructed as a simple U-shaped, bent metal sheet, wherein the protruding sides are oriented towards the outside, that is, averted from the mounting units 6. These protruding sides form sealing webs 66. When several catalyst modules 2 are strung together in the transverse direction 14, the lid part 44 of the one catalyst module 2 accommodates the base part 42 of the adjacent catalyst module 2 between the two sealing webs 66, so that a parting plane between the two catalyst modules 2 is sealed.

The stack frame 4 is formed as a whole by steel components, especially two-dimensional sheet-metal parts, the individual components having a wall thickness, for example, of 3 mm to 10 mm.

The catalyst module 2 is assembled preferably in the following way:

Initially, the side frame parts 40, 42, 44 are provided and, if necessary, assembled to form the hollow profiles. Subsequently, at first only the left side part 40 as well as the base part 42 are bolted together to form an L-shaped partial frame. Alternatively, a U-shaped partial frame may also be provided. The mounting units 6, equipped previously with the catalysts 10, are inserted successively in this L-shaped frame. Preferably, these are fixed exclusively by the holding brackets 20. After the mounting units 6 are inserted, the right side part 40 is first of all fixed to the L-shaped frame and, in so doing, the sealing element 50 is pressed between the outermost mounting unit 6 and the right side part 40. The sealing element 50 is first fixed mechanically here and especially by gluing to the side part 40, before the side part 40 is then attached by bolting. The lid part 44 is then attached in the same way with compression of the sealing element 50. The sealing element 50 is thus pressed against the top layer of the mounting units 6 by bolting. The sealing element 50 is divided, for example, into a plurality of sections, namely in particular one for the side part 40 and one for the lid part 44. Finally, at the end, the struts 28 are mounted. Therefore, by means of this manufacturing process, the individual mounting units 6 are clamped securely and reliably between the side frame parts 40, 42, 44. Since the sealing element 50 is clamped during the installation, it is compressed elastically over the whole surface thereof and clamped securely.

As a result of the construction described here and the special method of assembling the catalyst module, the following advantages especially are achieved:

A complex pressing device or welding equipment is not required for filling the stack frame 4 with the mounting units 6. A leak-free sealing and assembly is made possible by inserting the sealing element 50.

Horizontal sealing in the transverse direction 14 is accomplished easily by the lid parts 44, which are bent in U-shaped fashion.

Because the welded connections of the mounting units 6 to one another and between the mounting units 6 and the stack frame 4 are omitted, appreciable time is saved during the assembly. This also leads to appreciable reductions in cost, especially because no welding or pressing equipment is required.

Furthermore, because of the modular concept, which is described here, with the bolted side frame parts 40, 42, 44, it is also possible to ship the catalyst module 2 in individual parts. The volume of goods to be transported can be reduced by these means. Safe transport is also made possible by these means, since the individual components can be packed securely.

The use of the fitting element 30 and the sealing element 50 at the same time also provides a means which insulates the catalysts 10 against forces which are caused by temperature changes during heating up and contact with other parts of the catalyst module 2, or against vibrations or jolts which can occur during normal operation and act on the catalysts 10. The catalyst module 2 makes it possible to use catalysts 10 which are weaker in terms of their structure than those currently in use. At the same time, advantages such as reduced back-pressure, etc. are associated with this, since, on account of the insulating properties, they certainly do not have to have the strength exhibited by conventional catalysts.

Finally, there is also an improved flow guidance, since at least almost 100% of the area of the mounting units 6 is available.

| List of Reference Symbols | |
|---|---|
| 2 | catalyst module |
| 4 | stack frame |
| 6 | mounting unit |
| 10 | catalyst |
| 12 | longitudinal direction |
| 14 | transverse direction |
| 16 | surface |
| 18 | direction of flow |
| 20 | holding bracket |
| 22 | side wall |
| 24a | horizontal partition |
| 24b | vertical partition |
| 26 | mounting shaft |
| 28 | edge |
| 30 | fitting element |
| 32 | supporting mat |
| 34 | insertable funnel |
| 40 | side part |
| 42 | base part |
| 44 | lid part |
| 46 | bolted connection |
| 48 | struts |
| 50 | sealing element |
| 52a | U-shaped sheet metal part |
| 52b | flat sheet metal part |
| 54 | cover |
| 56 | ring hook |
| 58 | strip |
| 62 | slot |
| 63 | edge part |
| 64 | holding element |
| 66 | Sealing web |

The invention claimed is:

1. A catalyst module for use in an emission control system of a stationary incinerator comprising:
   a stack frame, that extends in a longitudinal direction and in a transverse direction and has two surfaces, that are opposite one another in a flow direction,
   at least one mounting unit inserted in the stack frame, where:
   each of the at least one mounting unit has a peripheral side wall and a plurality of intersecting horizontally and vertically arranged partitions each formed from metal sheet and disposed within the peripheral side wall, wherein the metal sheets are mutually enmeshed where the vertically and horizontally arranged partitions intersect, wherein free ends of the partitions that abut the inner peripheral side wall are connected thereto, wherein a material thickness throughout a sheet metal partition is the same as the material thickness of the two surfaces thereof and are not bent over and wherein the material thickness of the sheet metal partition is less than a wall thickness of the peripheral side wall, and
   the partitions form a lattice defining a plurality of mounting shafts, and a catalyst is inserted into each mounting shaft, wherein an elastic fitting sealing element that expands when the temperature rises in such a manner that a temperature-dependent variation of a necessary fitting distance between the respective catalyst and the mounting shaft is compensated for, so that the fitting element remains clamped when in use is interposed between the catalyst and internal surfaces of the horizontally and vertically arranged partitions defining the mounting shaft.

2. The catalyst module of claim 1, in which the fitting element is placed peripherally around the respective catalyst.

3. The catalyst module of claim 1, in which the stack frame has a peripheral wall composed of side frame parts and the side frame parts are connected to one another by at least one mechanical connecting element.

4. The catalyst module of claim 1, in which the stack frame has a peripheral wall composed of side frame parts and the side frame parts have sheet-metal parts, which are bent over.

5. The catalyst module of claim 4, in which the side frame parts are constructed in each case as a hollow profile of two sheet-metal parts, which are connected to one another.

6. The catalyst module of claim 1, in which at least some of the side frame parts have holding brackets, between which a respective mounting unit is held.

7. The catalyst module of claim 1, in which one of the side frame parts is constructed as a lid part and, at the outside, has at least one sealing web, which is disposed at the edge, wherein the sealing web is formed to close off a parting plane between two adjacent catalyst modules in the installed state.

8. A mounting unit for a catalyst module of claim 1, comprising a peripheral side wall and several intersecting horizontally and vertically arranged partitions each formed from metal sheet and disposed within the peripheral side wall, wherein the metal sheets are mutually enmeshed where the vertically and horizontally arranged partitions intersect, wherein free ends of the partitions that abut the inner peripheral side wall are connected thereto, wherein a material thickness throughout a sheet metal partition is the same as the material thickness of the two surfaces thereof and are not bent over and wherein the material thickness of the sheet metal partition is less than a wall thickness of the peripheral side wall, which partitions form a lattice defining a plurality of mounting shafts, into which one catalyst can be inserted.

9. A method for producing a catalyst module of claim 1, the methods comprising:
   providing a mounting unit with catalysts,
   partially assembling the stack frame,
   inserting the mounting units in the stack frame, which has been assembled only partly,
   closing the stack frame by pressing a sealing element between one side frame part of the stack frame and at least one of the mounting units.

10. The method of claim 9, further comprising pressing the catalysts, into a respective mounting shaft, using an insertable funnel with an elastic fitting interposed.

* * * * *